United States Patent [19]
Copa et al.

[11] Patent Number: 6,110,385
[45] Date of Patent: Aug. 29, 2000

[54] SYSTEM AND METHOD FOR REMOVING VOLATILE COMPOUNDS FROM A WASTE STREAM

[75] Inventors: William M. Copa; Russell G. Forbess, both of Schofield, Wis.

[73] Assignee: United States Filter Corporation, Palm Desert, Calif.

[21] Appl. No.: 09/092,363

[22] Filed: Jun. 5, 1998

[51] Int. Cl.$^7$ ...................................................... C02F 1/72
[52] U.S. Cl. .......................... 210/743; 210/758; 210/761; 210/205; 210/263; 210/903; 210/909
[58] Field of Search ..................................... 210/743, 758, 210/761, 903, 907, 909, 198.1, 175, 199, 181, 201, 205, 209, 255, 263; 95/159–161; 96/290

[56] References Cited

U.S. PATENT DOCUMENTS

| | | |
|---|---|---|
| 4,124,505 | 11/1978 | Horak et al. . |
| 4,141,828 | 2/1979 | Okada et al. . |
| 4,347,144 | 8/1982 | Bodenbenner et al. . |
| 4,350,599 | 9/1982 | Chowdhury . |
| 4,604,957 | 8/1986 | Cederquist . |
| 5,190,665 | 3/1993 | Titmas et al. . |
| 5,358,646 | 10/1994 | Gloyna et al. . |
| 5,614,087 | 3/1997 | Le . |
| 5,674,405 | 10/1997 | Bourhis et al. . |
| 5,720,889 | 2/1998 | McBrayer, Jr. et al. . |
| 5,820,761 | 10/1998 | Holzer et al. . |

FOREIGN PATENT DOCUMENTS

| | | |
|---|---|---|
| 37 14106 A1 | 11/1988 | Germany . |
| 40 18309 A1 | 12/1991 | Germany . |
| 44 00243 A1 | 7/1995 | Germany . |
| 52032874 | 3/1977 | Japan . |

*Primary Examiner*—David A. Simmons
*Assistant Examiner*—Fred Prince
*Attorney, Agent, or Firm*—Wolf, Greenfield & Sacks, P.C.

[57] ABSTRACT

A system and method for providing an oxidized liquid effluent stream substantially free of volatile compounds is provided. The system includes a stripper positioned downstream of a separator, or disposed within a separator. The method involves volatilizing volatile compounds by performing a separation followed by stripping, or in the same chamber as the separation. In another aspect, the invention involves adjusting the pH of the oxidized waste stream prior to stripping in order to convert ionic species to volatile species that can be removed by stripping.

32 Claims, 5 Drawing Sheets

SYSTEM AND METHOD FOR REMOVING VOLATILE COMPOUNDS FROM A WASTE STREAM

BACKGROUND OF THE INVENTION

1. Field of the Invention

The present invention is directed to wet air oxidation systems and methods for providing an oxidized waste stream substantially free of volatile compounds and, in particular, an oxidized waste stream substantially free of volatile organic compounds and/or ammonia.

2. Description of the Related Art

Wet air oxidation methods are a preferred method for treating waste streams containing oxidizable constituents, especially volatile organic compounds (VOCs), which are relatively easily oxidized. Moreover, the reaction products of the oxidation of organic compounds, including VOCs, are carbon dioxide and water, which generally do not present disposal or discharge problems. The oxidizable constituents of the waste stream may also include inorganic compounds that are soluble or suspended in the waste stream, such as, for example, reduced sulfur compounds and/or cyanides. Typical operating conditions at which most wet air oxidation units are operated are a temperature of about 150° C. to about 320° C. and a pressure of about 50 psig to about 4000 psig. Regardless of the operating temperature, since wet air oxidation reactions take place in a waste stream which comprises water, a superatmospheric pressure must be used during the wet air oxidation in order to prevent the water from evaporating at the typical operating temperatures. Consequently, the volatility of many compounds is suppressed during wet air oxidation due to the superatmospheric pressures. Therefore, at typical operating conditions, varying levels of volatile compounds may remain solubilized or suspended in the oxidized effluent, causing disposal and discharge problems. For example, many oxidized liquid effluents from wet air oxidation processes include constituents that may be toxic, even at relatively low concentrations, to the biological organisms found in a biological treatment plant. State or federal environmental regulations may also regulate the discharge of constituents that may be contained in such oxidized liquid effluents.

During wet air oxidation, there are competing pathways for the removal of volatile compounds in a wet air oxidation system. For example, volatile compounds in a waste stream may either be oxidized, or volatilized into a gas phase. The volatility of a volatile compound depends on the temperature and pressure at which the wet air oxidation system is operated. In general, increased temperatures tend to increase both volatility and the rate of oxidation. Increased pressure tends to suppress volatility, but does not substantially affect the rate of oxidation. Therefore, as operating temperatures in a wet air oxidation system increase, oxidation predominates, whereas at relatively lower operating temperatures, volatilization predominates.

Organic compounds may additionally contain other atomic species including, for example, sulfur, phosphorus, nitrogen, and halogens. During the wet air oxidation of such organic compounds, organically bound sulfur will be converted to inorganic sulfate; organically bound phosphorus will be converted to inorganic ortho phosphate; organically bound halogens will be converted to the corresponding inorganic halide; and organically bound nitrogen will be converted to ammonia nitrate, nitrate, nitrous oxide or molecular nitrogen.

At room temperature and ambient pressure, ammonia is a gas having a relatively high partial pressure that would normally allow it to volatilize. At the operating temperatures at which most wet air oxidation units are operated (typically about 150° C. to about 320° C.), ammonia is relatively stable. Generally, ammonia requires higher operating temperatures to undergo an oxidation reaction (typically greater than 320° C.). However, the volatility of compounds that are volatile at atmospheric pressure, including ammonia, are suppressed in wet air oxidation processes due to the superatmospheric pressure required to prevent water from evaporating.

Ammonia also has a characteristic tendency to act as a base, reacting with acids to produce the ammonium ion. Carbon dioxide, which is a typical reaction product of wet air oxidation, is an acid which imparts acidic behavior to the oxidation environment. Most wet air oxidation reactions are conducted in an acidic environment, which, in water, implies an excess of hydrogen ions ($H^+$). Under such conditions, ammonia will react with hydrogen ions to yield an ammonium ion ($NH_4^+$) as follows:

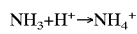

$$NH_3 + H^+ \rightarrow NH_4^+$$

Once ammonia is converted to the ammonium ion, it can no longer be volatilized under typical operating conditions. Consequently, the removal of ammonia from a waste stream is particularly difficult to achieve with conventional wet air oxidation systems since ammonia is not oxidized, its volatility is suppressed, and it tends to be converted to ammonium ion, which is retained in the wet air oxidized effluent. Ammonia, in particular, is a concern for biological treatment systems due to its potential for biological toxicity or inhibition.

Accordingly, a system and method for providing an oxidized waste stream substantially free of volatile compounds, particularly VOCs and/or ammonia, is desirable.

SUMMARY OF THE INVENTION

Accordingly, in one embodiment, a wet air oxidation method is provided. The method involves providing a first waste stream containing volatile and non-volatile compounds, oxidizing the first waste stream to produce a second waste stream containing at least a portion of the volatile compounds, and volatilizing the volatile compounds contained in the second waste stream to produce a final waste stream that is substantially free of the volatile compounds. After the wet air oxidation, a portion of the volatile compounds are volatilized by a pressure reduction, and another portion are volatilized by stripping. In one aspect, the method involves adjusting the pH to a preselected range before the stripping operation.

In another embodiment, a wet air oxidation system is provided. The system includes a first chamber in which a first waste stream containing volatile and non-volatile compounds is oxidized to produce a second waste stream containing at least a portion of the volatile compounds. The system also includes a second chamber fluidly connected to the first chamber and positioned downstream therefrom, wherein the second chamber receives the second waste stream from the first chamber and discharges a final waste stream that is substantially free of the volatile compounds.

In another embodiment, another wet air oxidation system is provided. The system includes a first chamber having an inlet for receiving a first waste stream containing volatile and non-volatile compounds and an outlet for discharging a second waste stream containing at least a portion of the volatile compounds. The system also includes a second chamber positioned downstream from the first chamber, the second chamber including an inlet in fluid communication with the outlet of the first chamber for receiving the second waste stream, an outlet for discharging volatilized compounds, and an outlet for discharging a third waste stream containing a lower quantity of the volatile compounds than the second waste stream. The system also includes a third chamber positioned downstream from the second chamber, the third chamber including an inlet in fluid communication with the outlet of the second chamber for receiving the third waste stream, an outlet for discharging the volatilized compounds, and an outlet for discharging a final waste stream that is substantially free of the volatile compounds.

BRIEF DESCRIPTION OF THE DRAWINGS

Preferred, non-limiting embodiments of the present invention will be described by way of example with reference to the accompanying drawings, in which.

DETAILED DESCRIPTION OF THE INVENTION

The present invention is directed to a wet air oxidation system and process for providing an oxidized liquid effluent that is substantially free of volatile compounds. The system and method of the present invention are particularly well-suited for providing such an effluent substantially free of VOCs and ammonia.

Figure 1:
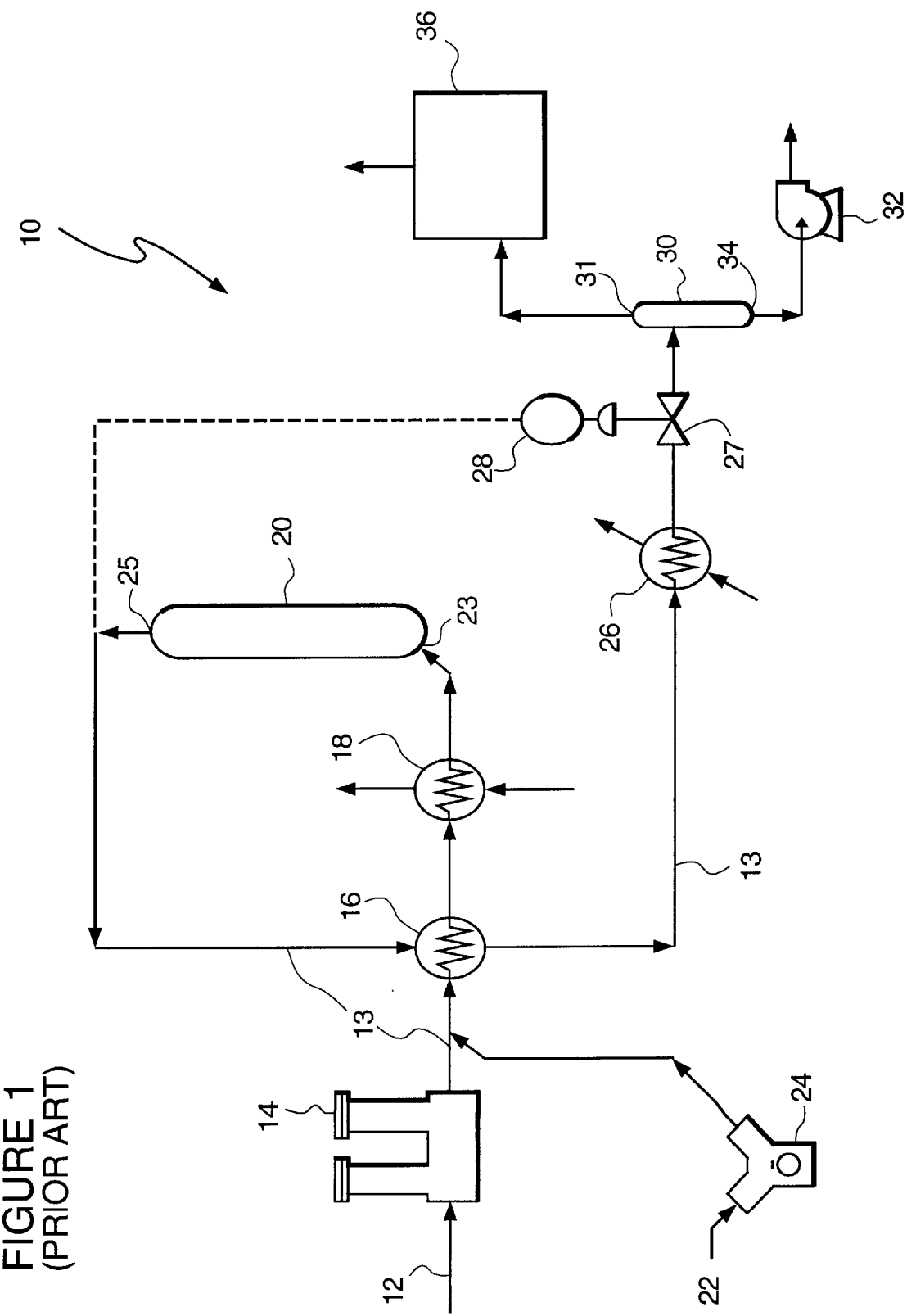
FIG. 1 is a schematic illustration of a conventional wet air oxidation system.

With reference to the figures, wherein like reference numerals indicate like elements, FIG. 1 shows a conventional wet air oxidation system 10. In operations, a wastewater feed 12 supplies a first wastewater to be treated to a high pressure pump 14 which elevates the pressure of the wastewater and conveys it through the system piping 13 to a heat exchanger 16, an auxiliary heater 18, and finally to a reaction chamber 20. The operating pressure of a wet air oxidation unit ranges from about 50 psig to about 4000 psig; preferably, from about 120 psig to about 3000 psig; and more preferably, from about 150 psig to about 2000 psig. The terms "wastewater" and "waste stream" are used interchangeably herein, referring to any type of water stream containing oxidizable constituents, including both volatile and non-volatile compounds. Compressed air 22 from an air compressor 24 is mixed with the pressurized wastewater before the pressurized wastewater enters the heat exchanger 16. In normal operation, the mixture of compressed air and wastewater is initially heated as it flows through the heat exchanger 16. After heating in the heat exchanger 16, the mixture flows to the auxiliary heater 18 where additional heat may be added from an external source. Typically, the external heat is in the form of steam generated in the boiler or from a plant utility. Auxiliary heat is needed only when insufficient heat is transferred in the process heat exchanger to raise the temperature of the incoming wastewater and mixture to the point where the oxidation reactions are initiated, i.e., the "light-off" temperature. The auxiliary heat may also be needed in the start-up of a wet air oxidation system from a colder ambient temperature, where an external source of heat is needed to initiate the heating of the cold incoming wastewater air mixture.

After heating the wastewater and air mixture in the process heat exchanger 16 and the auxiliary heater 18, the mixture is conveyed through the process piping to the wet air oxidation reaction chamber 20. The wastewater and air mixture is retained in the reactor for a period of time sufficient to complete the oxidation reactions. A typical residence time is about one hour. The heat released from the exothermic oxidation reactions raises the temperature of the wastewater and air mixture to a desired maximum value. The maximum value is generally used as a process control point, and is achieved through the combination of heat transferred in the process heat exchanger, heat input in the auxiliary heater, and heat released from the oxidation reaction in the reactor. The operating temperature of a subcritical wet air oxidation chamber ranges from about 100° C. to about 350° C.; preferably, from about 150° C. to about 320° C.; and more preferably, from about 150° C. to about 280° C.

When the oxidation reactions are complete, a second, oxidized effluent air stream is discharged through outlet 25 of reactor 20 and is conveyed through process piping 13 to the cool down side of process heat exchanger 16. The heat exchanger 16 exchanges heat from the hot effluent leaving the reaction chamber 20 to the cold incoming mixture of wastewater and compressed air. In the cool down side of the heat exchanger, the oxidized effluent/air mixture is cooled as heat is transferred to the cold incoming water air mixture. The system may additionally include a cooling unit 26, which is used to reduce the temperature of the effluent before entering a separator 30. Once the initial cooling is completed, the oxidized effluent and air mixture is conveyed through additional process piping to optional cooler 26, where additional cooling may occur. Additional cooling is brought about by the transfer of heat from the oxidized effluent to cooling water from an external source e.g. a cooling tower (not shown). Once cooling is completed, the oxidized effluent and air mixture passes through pressure control valve 27, which reduces the pressure on the mixture to ambient air pressure, or some intermediate elevated pressure, for example, up to approximately 345 kPa (50 psig) which may be maintained in the separator 30. Typically, a reactor maximum temperature sensor is mounted on the process piping between reactor outlet 25 and process heat exchanger 16. It is also common to mount a pressure sensor 28 on the piping in order to control the pressure in the wet air oxidation system. As shown, this pressure sensor device 28 may be used to control the opening and closing of downstream pressure control valve 27, thereby regulating pressure in the system.

In the separator 30, volatile compounds separate from the oxidized effluent to produce an off-gas containing volatilized compounds that is discharged through outlet 31, and a liquid effluent containing a portion of the volatile compounds which were not oxidized or volatilized in reactor 20 nor volatilized in separator 30, that is discharged through outlet 34. In some wet air oxidation systems separator 30 is kept at a slightly elevated pressure to provide the motive force to discharge the off-gas through outlet 31, to convey the offgas to an offgas treatment system 36, and/or to convey the oxidized effluent to a post-treatment system such as a biological wastewater treatment plant. Typically, the oxidized effluent discharged through outlet 34 is conveyed via an oxidized liquid pump 32.

As previously described, in a conventional system, the volatility of many compounds is suppressed due to the superatmospheric operating pressures, and varying levels of volatile compounds may remain solubilized or suspended in the oxidized effluent. State or federal environmental regulations may also regulate the discharge of constituents that may be contained in such oxidized liquid effluents. For example, current NESHAP regulations limit the discharge of benzene to a concentration of less than 0.5 ppm. A conventional wet oxidation system and process will, as described above, typically achieve reduced benzene concentrations only as low as about 2–3 ppm, which therefore cannot be discharged. Even unregulated discharges from a conventional wet oxidation system may present problems, as described previously with regard to ammonia.

Figure 2:
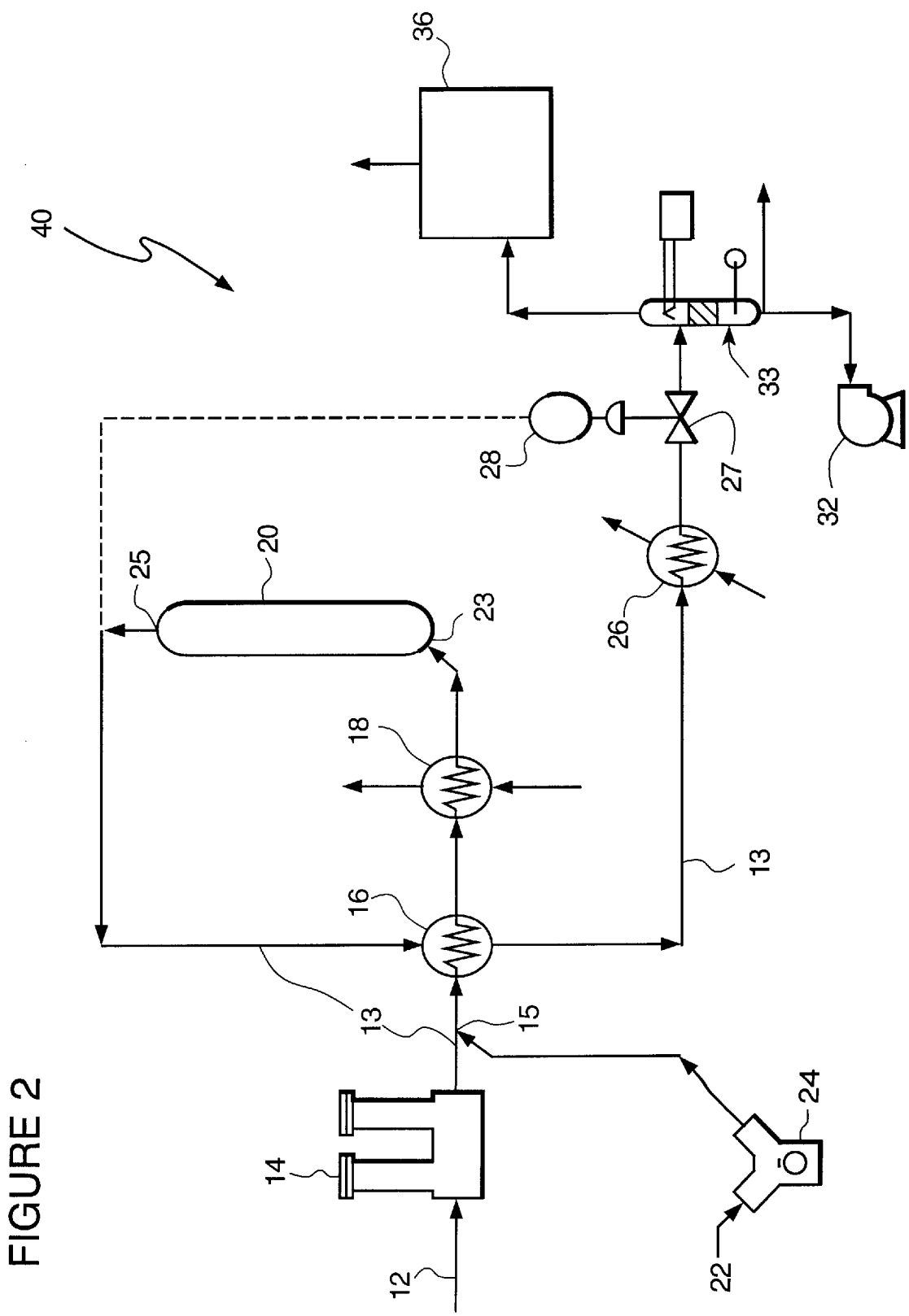
FIG. 2 is a schematic illustration of an embodiment of a wet air oxidation system according to the present invention.

Referring now to FIG. 2, a schematic view of a wet air oxidation system 40 is illustrated according to one embodiment of the present invention. The wet air oxidation system 40 preferably includes first reaction chamber 20 having inlet 23 and outlet 25. The reaction chamber 20 is typically an elongated upright cylinder, as is known in the art, although other shapes and positions may be used. Preferably, the system 40 includes high pressure pump 14, heat exchanger 16 and auxiliary heater 18 fluidly connected in sequence via system piping 13 to inlet 23 of reaction chamber 20. Air compressor 24 is also preferably fluidly connected to system piping 13 at a location 15 between high pressure pump 14 and heat exchanger 16. Outlet 25 of reaction chamber 20 is also fluidly connected to heat exchanger 16 via system piping 13, which extends therefrom through heat exchanger 16 to fluidly connect cooling unit 26, pressure control valve 27, and a second chamber, separator/stripper 33.

Figure 3A:
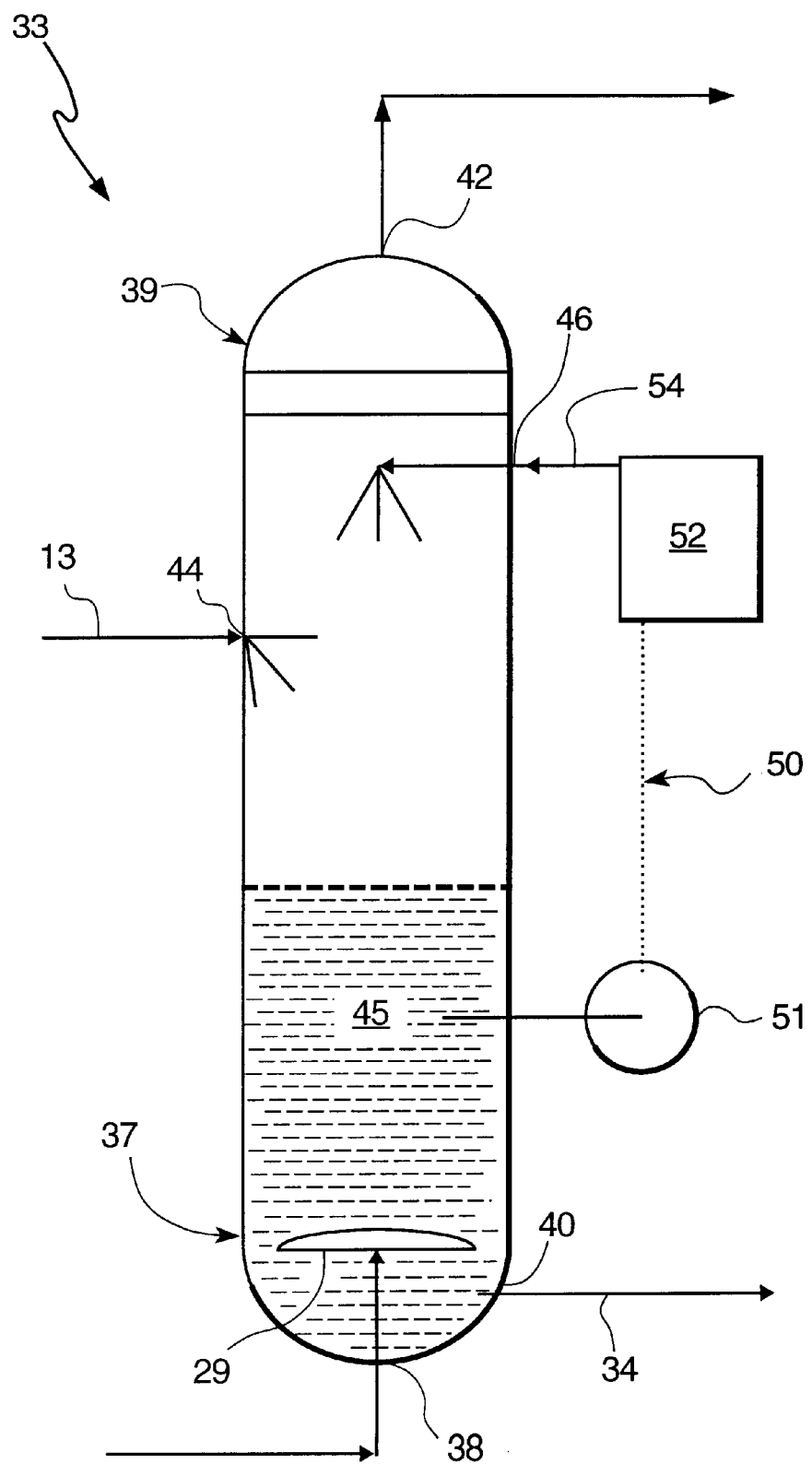
FIG. 3A is an enlarged schematic illustration of a portion of the wet air oxidation system of FIG. 2.

As illustrated in more detail in FIG. 3A, separator/stripper 33 is fluidly connected downstream of reaction chamber 20 via additional system piping 13. In the present embodiment, separator/stripper chamber 33, is typically an elongated cylinder positioned in an upright position having opposing lower and upper ends 37 and 39, although other shapes and positions may be used. Separator/stripper 33 also preferably includes a first inlet 38 and a first outlet 40 at lower end 37, a second outlet 42 at the opposing upper end 39, and second and third inlets 44 and 46 preferably positioned between first inlet 38 and second outlet 42. Preferably, a sparger device 29 is positioned in the lower end 37 of the separator/stripper 33.

The present embodiment may also include a pH monitoring and adjusting system 50 operatively connected to separator/stripper 33, including a pH monitor 51 operatively connected to separator/stripper 33, and a source of chemical treating agent 52 fluidly connected by a feed line 54 to separator/stripper 33, with the feed line 54 positioned above the accumulated second waste stream 45. "Chemical treating agent," as used herein, is meant to define a pH adjusting substance, for example, a caustic solution to increase the pH, or an acidic solution to decrease the pH, depending on the ionic species to be neutralized or removed.

In practice, the process using the system illustrated in FIGS. 2–3A involves providing a first waste stream containing volatile and non-volatile compounds, and conveying the first waste stream to reaction chamber 20. "Volatile compounds," as used herein, is meant to define any compound that is volatile at atmospheric pressure, such as, but not limited to, VOCs and ammonia. A portion of the first waste stream containing the volatile and non-volatile compounds is oxidized in the reaction chamber 20 to produce a second waste stream containing at least a portion of the volatile compounds that were contained in the first waste stream. The second waste stream is discharged through reactor outlet 25 and conveyed via the system piping 13 through the cool down side of heat exchanger 16, cooling unit 26, pressure control valve 27 and into separator/stripper 33 via inlet 44. The separator/stripper 33 receives the second waste stream from first chamber 20 via system piping 13. The second waste stream is subjected to a pressure drop as it flows through pressure control valve 27. As a result of the pressure drop, at least a portion of the volatile compounds contained in the second waste stream are volatilized, comprising what is commonly known as the off-gas. Also as a result of the pressure drop, a third waste stream is produced, commonly known as an oxidized liquid effluent, which still contains a portion of the volatile compounds that were not oxidized or volatilized in reaction chamber 20, or volatilized during the pressure drop.

As the third waste stream flows through inlet 44, it accumulates at lower end 37 of separator/stripper 33. At the same time, a stripping gas flows into the separator/stripper 33 through inlet 38 at lower end 37, below sparge device 29. The stripping gas flows upwardly from sparger 29 through the accumulated third waste stream 45, affecting intimate contact between the stripping gas and the volatile compounds contained therein. The stripping may involve air or steam stripping, during which volatile components may be separated by volatilization into a stream of air or steam which is contacted with the water. The terms "air stripping" and "steam stripping," as used herein, are used as they are known in the art, referring to operations typically accomplished using, for example, a sparge device, a bed of packing material, or multiple sieve trays, which affect intimate contact between the water and the air or steam.

As a result of the combined separating/stripping, the final waste stream that is discharged from outlet 34 is substantially free of the volatile compounds. "Substantially free of volatile compounds," as used herein, means that the concentration of volatile compounds in the final waste stream is lower than that which may be achieved in a conventional system, as shown for example, in FIG. 1. For example, in the case of ammonia, this term means that the final waste stream can be discharged to a biological treatment plant, i.e., the concentration of ammonia is reduced sufficiently to prevent toxic effects on the biological organisms contained therein. In addition, this term may also mean that the concentration of volatile compounds, for example, is sufficiently low to meet guidelines for discharges regulated by environmental agencies such as NESHAP. Also as a result of the combined separating/stripping, the volatile compounds are volatilized from the third waste stream and are discharged through outlet 42 at upper end of chamber 33. The volatile compounds may then be conveyed to further treatment, if needed, such as to off-gas treatment system 36. The motive force for conveying the volatile compounds may be provided by an external source, such as, for example, pump 32. Alternatively, if the volatile compounds are discharged at superatmospheric pressure, the elevated pressure will provide the motive force and an external supply of energy will not be required.

In operation, the pH monitoring and adjusting system 50 is used to measure the pH of the accumulated oxidized liquid effluent 45 from the third waste stream after it flows through inlet 44. If the pH measurement does not fall within preselected limits, the system 50 may cause chemical treating agent 52 to be fed through feed line 54 to separator/stripper 33, preferably above the level of the accumulated oxidized liquid effluent 45, and preferably above inlet 44.

In yet another aspect of the invention, the process involves adjusting the pH of the second or third waste stream to a preselected range in order to facilitate the conversion of non-volatile ionic species to volatile non-ionic species. In a preferred embodiment, the pH of the second or third waste stream is adjusted to between about 9 to about 13, preferably between about 10 to about 12, in order to facilitate the conversion of non-volatile ammonium ions to volatile ammonia. Therefore, when the second waste stream is subjected to a pressure drop, and/or the third waste stream is stripped, the ammonia is volatilized and removed through outlet 42 along with other types of volatilized components, such as, for example, VOCs. Depending upon the particular ionic species being removed, these streams and/or any accumulated liquid effluent may alternatively require pH adjustment to acidic pH ranges.

Figure 3B:
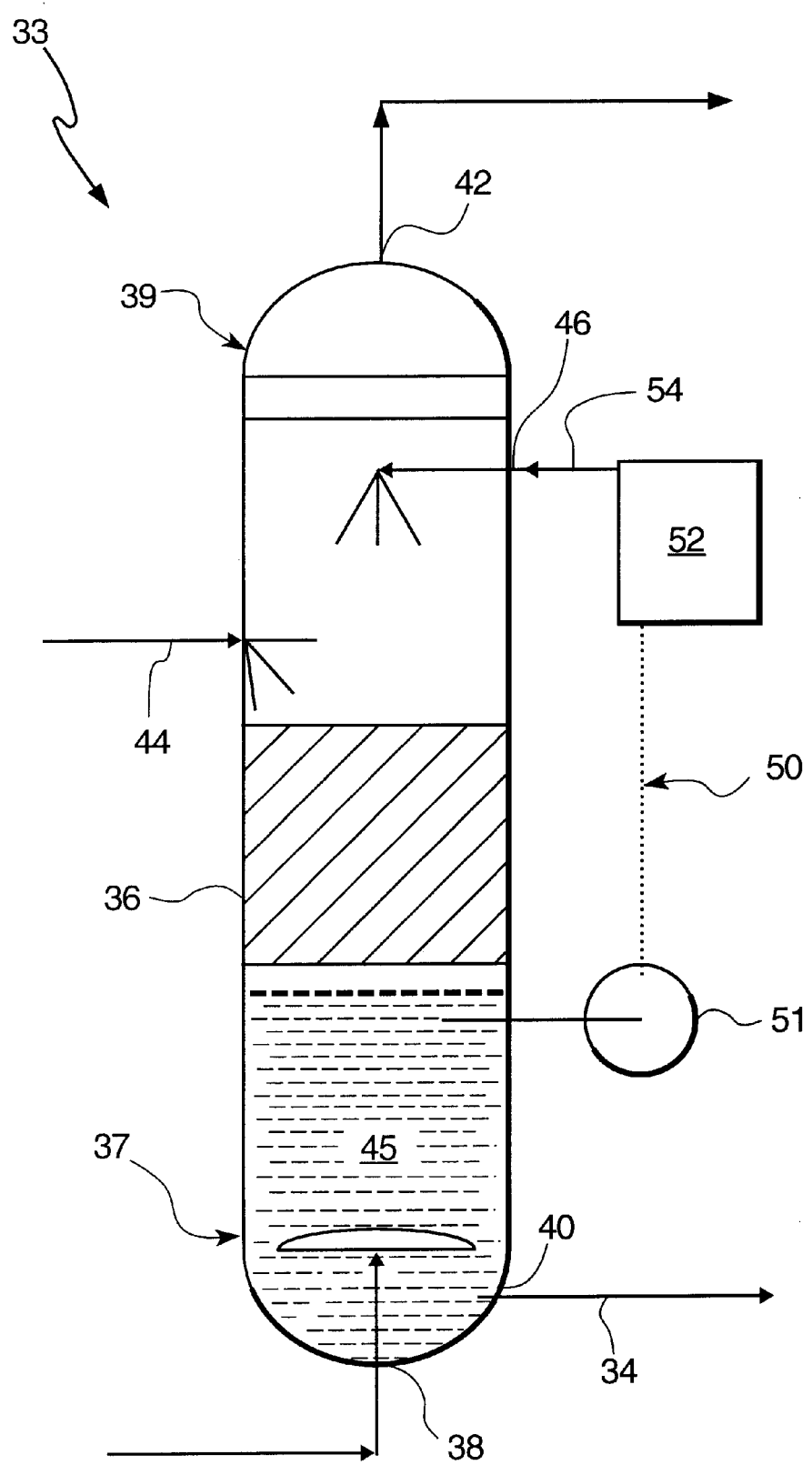
FIG. 3B is an enlarged schematic illustration of a portion of the wet air oxidation system of FIG. 2.

In another embodiment of the invention, as illustrated in FIG. 3B, a separation medium 36 is disposed within separator/stripper 33. Although not necessary in this embodiment, the sparger device 29 may also be included in separator/stripper 33. The separation medium 36 may comprise any number of materials known in the art, including, but not limited to, a packed bed column, a column of multiple sieve tray sections, and the like. There are no restrictions placed on the position of the separation medium other than that it must be disposed beneath the inlet 44 for receiving the incoming third waste stream, and above stripping gas inlet 38 and the final waste outlet 34. The separator/stripper 33 according to this aspect of the invention also preferably includes a pH monitoring and adjusting system 50 operatively connected to the separator/stripper chamber 33, and chemical treating agent 52 fluidly connected by feed line 54 to separator/stripper 33, with feed line 54 positioned above separation medium 36.

In operation, pH monitoring and adjusting system 50 is used to measure the pH of the waste stream after it flows through separation medium 36. If the pH measurement does not fall within preselected limits, system 50 may cause chemical treating agent 52 to be fed through feed line 54 to separator/stripper 33, above separation medium 36, and preferably above inlet 44, in order to maintain the pH of the waste stream within the preselected range after passing through separation medium 36.

Figure 4:
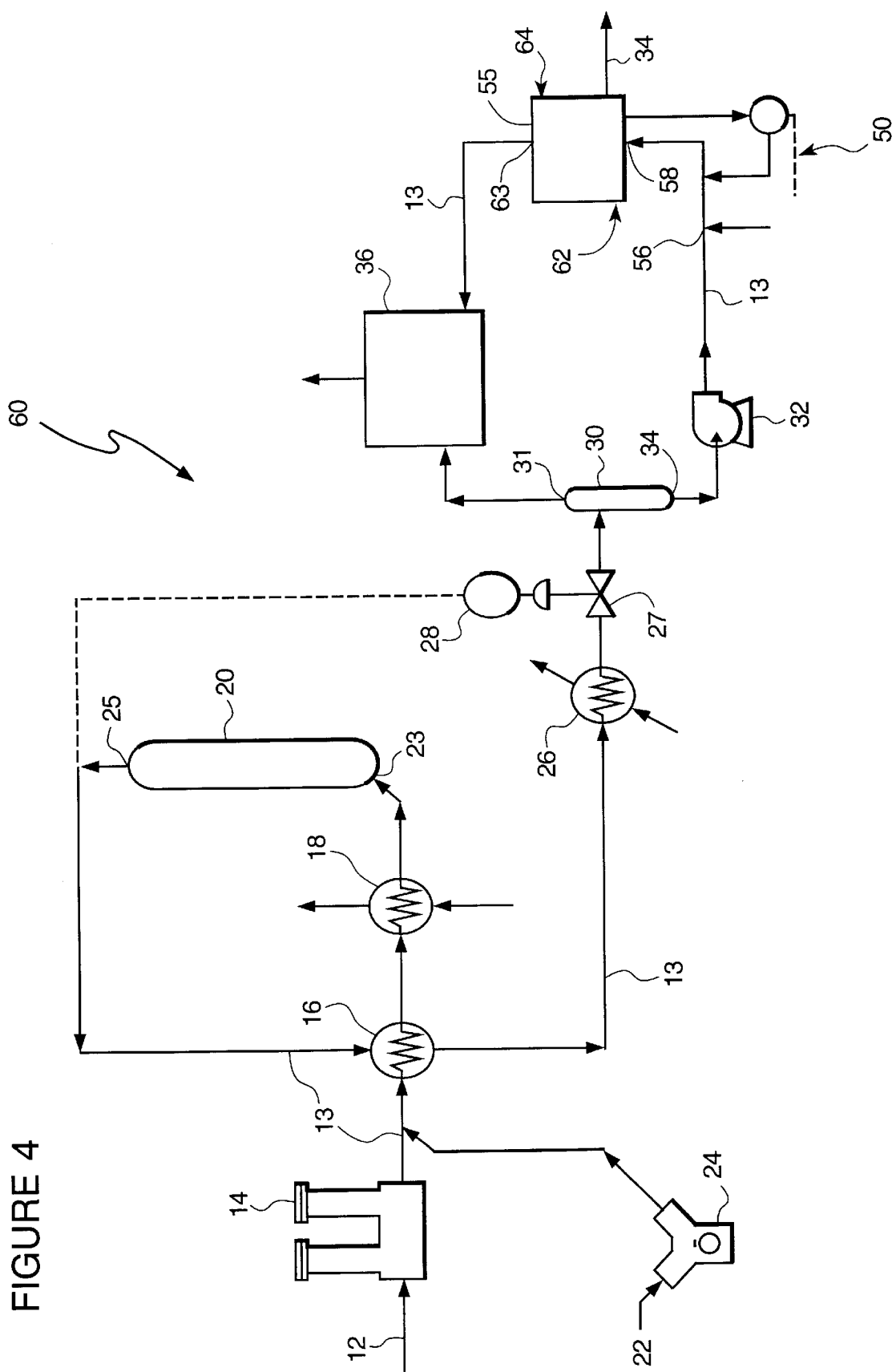
FIG. 4 is a schematic illustration of another second embodiment of a wet air oxidation system according to the present invention.

Referring now to FIG. 4, a schematic view of a wet air oxidation system 60 is illustrated according to another embodiment of the present invention. In this embodiment, system 60 is substantially similar to that illustrated in FIG. 1. In addition, system 60 further includes a third chamber 55, commonly known as a stripping chamber, fluidly connected downstream of separation chamber 30 via additional system piping 13. In the present embodiment, stripping chamber 55, is typically an elongated upright cylinder having opposing upper and lower ends 64 and 62, although other shapes and positions may be used. Stripping chamber 55 also preferably includes a first inlet 58 at lower end 62, and a first outlet 63 at opposing upper end 64. Outlet 63 is fluidly connected to off-gas treatment system 36, although such a connection is not necessary. For example, outlet 63 might connected to an alternate treatment system, or none at all, depending on the application. Although not illustrated, either a sparger device 29 as shown in FIG. 3A, a separation medium 36 as shown in FIG. 3B, or both, may be positioned within the stripping chamber 55. As in the previous embodiment, separation medium 36 may comprise any number of materials known in the art, including, but not limited to, a packed bed column, a column of multiple sieve tray sections, or the like.

In one aspect, wet oxidation system 60 may also include a pH monitoring and adjusting system 50 operatively connected to stripping chamber 55, and a chemical treating agent 52 fluidly connected to the process piping before stripping chamber 55, via piping inlet 56. In operation, the pH monitoring and adjusting system 50 is used to measure the pH of the separated, oxidized liquid effluent, or third waste stream, after it flows through separation chamber 30. If the pH measurement does not fall within preselected limits, system 50 may cause chemical treating agent 52 to be fed into the process piping via feed inlet 56 in order to adjust the pH of the third waste stream within the preselected range before passing through stripping chamber 55.

In practice, the system illustrated in FIG. 4 operates similarly to the conventional system illustrated in FIG. 1. After separation of the volatile compounds from the oxidized effluent in separator 30, the off-gas containing volatilized compounds is discharged through outlet 31 and conveyed to off-gas treatment systems 36. The oxidized liquid effluent, still containing a portion of the volatile compounds which were not oxidized or volatilized in reactor 20 or volatilized in separator 30, is discharged through outlet 34, and conveyed to stripping chamber 55 via pump 32.

The stripping chamber operates in a manner similar to those described with respect to previous embodiments. The volatile compounds that are volatilized during the stripping operation are discharged from stripping chamber 55 through outlet 63, and conveyed to off-gas treatment system 36. In a preferred embodiment, not illustrated, outlets 31 and 63 may be fluidly connected to each other to be combined into a single stream of volatile compounds before entering off-gas treatment system 63. Alternatively, outlet 63 may not be connected in any manner to the off-gas treatment system, and the volatile compounds discharged therefrom may be conveyed to an alternate treatment system. The final waste stream produced after the volatile compounds have been separated from the third waste stream in stripper 55 are discharged through outlet 34, substantially free of the volatile compounds.

Each of the described systems and processes provide an oxidized waste stream that is substantially free of volatile compounds. All combinations and permutations of the systems and operational methods are available for practice with various waste streams as the need arises. The systems and processes are particularly effective in applications that have very low maximum concentration thresholds for individual or combinations of contaminants. For example, the systems and methods of the present invention may be used to remove compounds that are resistant to wet air oxidation, such as, but not limited to: amines such as pyridine, volatile acids such as formic and acetic acid, BTEX compounds (benzene, toluene, ethyl benzene, and xylene). Additional compounds that may be removed using method of the present invention that involves adjusting the pH prior to stripping include the removal of ionic forms of carbon dioxide (carbonates and bicarbonates)that remain soluble in an alkaline wet air oxidation effluents, but may be converted to gaseous carbon dioxide by adjusting the pH to a range.

EXAMPLE 1

The effectiveness of the wet air oxidation method of the present invention was evaluated with respect to a wastewater from the manufacturing of amines, having a chemical oxygen demand (COD) of 29,900 mg/l, a total Kjeldahl nitrogen (TKN) concentration of 16,300 mg/l, an ammonia nitrogen ($NH_3$-N) concentration of 8,800 mg/l, and a pH of 11.9. This wastewater was treated, initially, by wet air oxidation and the oxidized liquid was, subsequently, treated by air stripping to reduce the ammonia concentration.

A sample of the untreated amine wastewater was placed in an autoclave and, after closing, the autoclave was pressurized with compressed air to provide sufficient overpressure to maintain water in the liquid phase during the subsequent heating. The autoclave was heated to 260° C. and kept at this temperature for one hour. After one hour at temperature, the autoclave was cooled, depressurized, and opened. A portion of the oxidized liquid was placed in a gas stripping bottle and the pH of the oxidized liquid was adjusted using a solution of sodium hydroxide. The air stripping train, consisting of the gas stripping bottle and a series of midget impingers containing a solution of hydrochloric acid, was assembled. The air stripping train was connected to a compressed air supply and air was bubbled through the oxidized liquid, to strip the ammonia, and then through the hydrochloric acid solution to absorb the ammonia from the air. The ammonia was stripped from the oxidized liquid by the air and carried to the impingers containing the hydrochloric acid solution, where it was reabsorbed. The air stripping was stopped after ammonia was no longer detected from the gas stripping bottle. The air stripped liquid sample was removed from the gas stripping bottle and analyzed for TKN and ammonia. The analyses of the untreated amine wastewater, the wet air oxidized liquid, and the air stripped oxidized liquid are shown in Table 1.

The results of this test show that essentially all of the non-ammoniacal nitrogen, calculated from the TKN value minus the $NH_3$-N, in the amine wastewater is converted to ammonia during the wet air oxidation treatment. The air stripping test showed that a high percentage (97%) of the ammonia could be stripped from the oxidized effluent.

TABLE 1

Wet Air Oxidation of an Amine Wastewater
Followed by Air Stripping of the Oxidized Liquid

| Parameter | Autoclave Feed | Wet Air Oxidized Liquid | Air Stripped Oxidized Liquid |
|---|---|---|---|
| COD, mg/l | 29,000 | 6,085 | — |
| TKN, mg/l | 16,300 | 12,100 | 350 |
| $NH_3$—N, mg/l | 8,800 | 11,900 | 350 |
| pH | 11.9 | 9.7 | 10 |

If one attempted to treat the un-stripped oxidized liquid in a biological treatment plant, the high concentration of ammonia would be toxic to the biological organisms. However, the stripped oxidized liquid could be readily treated in a biological treatment system without concern for biological toxicity or inhibition due to the concentration of ammonia in this liquid.

Although particular embodiments of the invention have been described in detail for purposes of illustration, various changes and modifications may be made without departing from the scope and spirit of the invention. Accordingly, the invention is not to be limited except as by the appended claims.

What is claimed is:

1. A wet air oxidation method, comprising:
   providing a first waste stream containing volatile and non-volatile compounds, wherein at least one of the volatile compounds is selected from the group consisting of benzene, toluene, ethyl benzene, and xylene;
   oxidizing the first waste stream in a wet air oxidation apparatus under subcritical conditions to produce a second waste stream containing at least a portion of the volatile compounds; and
   volatilizing the volatile compounds contained in the second waste stream to produce a final waste stream that is substantially free of the volatile compounds.

2. The wet air oxidation method of claim 1, wherein at least a portion of the volatile compounds in the second waste stream are volatilized by reducing the pressure of the second waste stream from a first pressure to a second pressure to produce a third waste stream having a lower quantity of the volatile compounds than the second waste stream.

3. The wet air oxidation method of claim 2, wherein the volatile compounds contained in the third waste stream are volatilized in a stripping operation.

4. The wet air oxidation method of claim 3, further comprising:
   adjusting the pH of the third waste stream to a preselected range before the stripping operation.

5. The wet air oxidation method of claim 3, further comprising:
   adjusting the pH of the third waste stream to a preselected range before the stripping operation, such that ionic species are converted to volatile species that are removed from the third waste stream with the volatile compounds volatilized by the pressure reduction and by the stripping operation.

6. The wet air oxidation method of claim 3, wherein the pH of the third waste stream is adjusted to a range within which ammonium ions are converted to ammonia before stripping the volatile compounds from the third waste stream, such that the ammonia is volatilized and removed from the third waste stream with the volatile compounds volatilized by the pressure reduction and by the stripping operation.

7. The wet air oxidation method of claim 6, wherein the pH range is adjusted between about 9 to about 13.

8. The wet air oxidation method of claim 7, wherein the pH range is adjusted between about 10 to about 12.

9. The wet air oxidation method of claim 2, wherein the pressure is reduced from a subcritical first superatmospheric pressure to a second superatmospheric pressure.

10. The wet air oxidation method of claim 2, wherein the pressure is reduced from a subcritical first superatmospheric pressure to atmospheric pressure.

11. The wet air oxidation method of claim 1, wherein the first waste stream is oxidized at a temperature ranging from about 100° C. to about 350° C. and a pressure ranging from about 50 psig to about 3000 psig.

12. The wet air oxidation method of claim 11, wherein the first waste stream is oxidized at a temperature ranging from about 150° C. to about 320° C. and a pressure ranging from about 120 psig to about 3000 psig.

13. The wet air oxidation method of claim 12, wherein the first waste stream is oxidized at temperature ranging from about 150° C. to about 280° C. and a pressure ranging from about 150 psig to about 2000 psig.

14. A wet air oxidation system, comprising:
   a subcritical wet air oxidation chamber in which a first waste stream containing volatile and non-volatile compounds is oxidized to produce a second waste stream containing at least a portion of the volatile compounds, wherein at least one of the volatile compounds is selected from the group consisting of benzene, toluene, ethyl benzene, and xylene; and a separator chamber fluidly connected to the subcritical wet air oxidation chamber and positioned downstream therefrom, wherein the separator chamber receives the second waste stream from the subcritical wet air oxidation chamber and discharges a final waste stream that is substantially free of the volatile compounds.

15. The wet air oxidation system of claim 14, wherein:

the separator chamber includes a first end and a second end;

the first end includes a first inlet for receiving a stripping gas and a first outlet for discharging the final waste stream; and the second end includes a second inlet for receiving the second waste stream and a second outlet for discharging the volatilized compounds from the second waste stream; and a sparging device disposed between the first inlet and the second inlet.

16. The wet air oxidation system of claim 14, wherein:

the separator chamber includes a first end and a second end;

the first end includes a first inlet for receiving a stripping gas and a first outlet for discharging the final waste stream; and the second end includes a second inlet for receiving the second waste stream and a second outlet for discharging the volatilized compounds from the second waste stream; and a separation medium disposed between the first inlet and the second inlet.

17. The wet air oxidation system of claim 15, further comprising a chemical treating agent fluidly connected by a feed line to the second chamber and positioned above the sparging device; and a pH monitoring and adjusting system operatively connected to the separator chamber and to the feed line for measuring the pH of the second waste stream and causing the chemical treating agent to be fed to the separator chamber in order to maintain the pH of the second waste stream within a preselected range.

18. The wet air oxidation system of claim 16, further comprising:

a chemical treating agent fluidly connected by a feed line to the separator chamber and positioned above the separation medium; and a pH monitoring and adjusting system operatively connected to the separator chamber and to the feed line for measuring the pH of the second waste stream and causing the chemical treating agent to be fed to the separator chamber in order to maintain the pH of the second waste stream within a preselected range.

19. The wet air oxidation system of claim 15, wherein the volatilized compounds are discharged from the separator chamber at a subcritical pressure greater than atmospheric pressure.

20. The wet air oxidation system of claim 16, wherein the volatilized compounds are discharged from the separator chamber at a subcritical pressure greater than atmospheric pressure.

21. The wet air oxidation system of claim 16, wherein the separation medium is selected from the group consisting of packed beds and multiple sieve tray sections.

22. The wet air oxidation system of claim 18, wherein the separation medium is selected from the group consisting of packed beds and multiple sieve tray sections.

23. A wet air oxidation system, comprising:

a subcritical wet air oxidation chamber having an inlet for receiving a first waste stream containing volatile and non-volatile compounds and an outlet for discharging a second waste stream containing at least a portion of the volatile compounds, wherein at least one of the volatile compounds is selected from the group consisting of benzene, toluene, ethyl benzene, and xylene;

a chamber positioned downstream from the subcritical wet air oxidation chamber, the chamber including an inlet in fluid communication with the outlet of the subcritical wet air oxidation chamber for receiving the second waste stream, an outlet for discharging volatilized compounds, and an outlet for discharging a third waste stream having a lower quantity of the volatile compounds than the second waste stream; and a separator chamber positioned downstream from the chamber, the separator chamber including an inlet in fluid communication with the outlet of the chamber for receiving the third waste stream, an outlet for discharging the volatilized compounds, and an outlet for discharging a final waste stream that is substantially free of the volatile compounds.

24. The wet air oxidation system of claim 23, further comprising:

a sparging device disposed in the separator chamber; and a source of a stripping gas fluidly connected to the separator chamber, such that the stripping gas can be passed through the sparging device.

25. The wet air oxidation system of claim 23, further comprising:

a separation medium disposed in the separator chamber; and a source of a stripping gas fluidly connected to the separator chamber, such that the stripping gas can be passed through the separation medium.

26. The wet air oxidation system of claim 23, further comprising:

a common outlet fluidly connected to the chamber and the separator chamber to combine the discharge of the volatilized compounds from the chamber and the separator chamber into a single stream of volatilized compounds.

27. The wet air oxidation system of claim 24, further comprising:

a chemical treating agent fluidly connected by a feed line to the separator chamber and positioned above the sparging device; and a pH monitoring and adjusting system operatively connected to the separator chamber and to the feed line for measuring the pH of the third waste stream and causing the chemical treating agent to be fed to the separator chamber in order to maintain the pH of the third waste stream with in a preselected range.

28. The wet air oxidation system of claim 25, further comprising:
a chemical treating agent fluidly connected by a feed line to the separator chamber and positioned above the separation medium; and
a pH monitoring and adjusting system operatively connected to the separator chamber and to the feed line for measuring the pH of the third waste stream and causing the chemical treating agent to be fed to the separator chamber in order to maintain the pH of the third waste stream within a preselected range.

29. The wet air oxidation system of claim 26, wherein the single stream of volatilized compounds is discharged at a subcritical pressure and greater than atmospheric pressure.

30. The wet air oxidation system of claim 26, wherein the single stream of volatilized compounds is discharged at atmospheric pressure.

31. The wet air oxidation system of claim 25, wherein the separation medium is selected from the group consisting of packed beds and multiple sieve tray sections.

32. The wet air oxidation system of claim 28, wherein the separation medium is selected from the group consisting of packed beds and multiple sieve tray sections.

* * * * *